(12) United States Patent
Grabarek

(10) Patent No.: US 11,874,963 B2
(45) Date of Patent: Jan. 16, 2024

(54) MULTIFUNCTIONAL FINGER-ACTIVATED DEVICE

(71) Applicant: Robert Grabarek, Clinton, CT (US)

(72) Inventor: Robert Grabarek, Clinton, CT (US)

( * ) Notice: Subject to any disclaimer, the term of this patent is extended or adjusted under 35 U.S.C. 154(b) by 0 days.

(21) Appl. No.: 17/566,943

(22) Filed: Dec. 31, 2021

(65) Prior Publication Data
US 2023/0214016 A1    Jul. 6, 2023

(51) Int. Cl.
*G06F 3/01* (2006.01)
*F21V 23/04* (2006.01)

(52) U.S. Cl.
CPC .......... *G06F 3/014* (2013.01); *F21V 23/0471* (2013.01)

(58) Field of Classification Search
CPC .......... G06K 7/10891; G06K 7/10772; G06K 7/1417; G06K 7/1413; G06F 3/014; F21V 23/0471
See application file for complete search history.

(56) References Cited

U.S. PATENT DOCUMENTS

| | | | |
|---|---|---|---|
| 5,029,508 A * | 7/1991 | Suzuki | G10H 1/34 84/742 |
| 5,086,378 A | 2/1992 | Prince | |
| 5,216,193 A * | 6/1993 | Masubuchi | G10H 1/0558 84/626 |
| 5,242,440 A * | 9/1993 | Shippert | H01H 9/0214 606/49 |
| 5,255,167 A | 10/1993 | Toussaint et al. | |
| 5,796,354 A * | 8/1998 | Cartabiano | G06F 3/014 345/157 |
| 6,082,872 A | 7/2000 | Ting | |
| 6,669,388 B1 | 12/2003 | Short | |
| 7,918,808 B2 * | 4/2011 | Simmons | B25J 9/0006 600/590 |
| 8,540,389 B2 | 9/2013 | Tang | |
| 8,975,606 B2 | 3/2015 | Bowers | |
| 9,352,462 B2 | 5/2016 | Laybourne | |
| 10,152,141 B1 * | 12/2018 | Lohse | G06F 3/014 |
| 10,427,293 B2 * | 10/2019 | Asbeck | B25J 9/0006 |
| 10,677,436 B2 | 6/2020 | Schorr, III | |
| 2003/0079973 A1 * | 5/2003 | Sun | H01H 9/0214 200/52 R |
| 2004/0121702 A1 * | 6/2004 | Seibert | A63H 3/14 446/270 |
| 2004/0164880 A1 * | 8/2004 | Nguyen | G06F 3/014 341/20 |
| 2004/0190383 A1 * | 9/2004 | Marcucelli | G04B 37/1433 368/278 |
| 2006/0007669 A1 | 1/2006 | Blackburn | |
| 2006/0129070 A1 * | 6/2006 | Pearl | A61B 5/418 600/595 |

(Continued)

FOREIGN PATENT DOCUMENTS

WO    2019037825 A1    2/2019

*Primary Examiner* — William Lu
(74) *Attorney, Agent, or Firm* — St. Onge Steward Johnston & Reens LLC; Tatyana Voloshchuk

(57) ABSTRACT

A multifunctional finger-mounted device includes a finger mount configured for attachment to at least one of a user's fingers, a tool holder positioned on the finger mount and configured to receive at least one tool, an electronics unit connected to the at least one tool, and a switch for actuating the electronics unit. The switch is actuated by bending and straightening a user's finger.

19 Claims, 11 Drawing Sheets

(56) References Cited

U.S. PATENT DOCUMENTS

| | | |
|---|---|---|
| 2008/0062676 A1 | 3/2008 | Masuda |
| 2008/0226134 A1* | 9/2008 | Stetten .................. G06F 3/0317 340/407.1 |
| 2010/0219989 A1* | 9/2010 | Asami ..................... G06F 3/014 341/20 |
| 2012/0140452 A1* | 6/2012 | Martinez ............ A41D 19/0157 362/103 |
| 2012/0319940 A1* | 12/2012 | Bress ...................... G06F 3/014 345/156 |
| 2015/0106996 A1* | 4/2015 | Lau ......................... B62J 6/165 340/432 |
| 2015/0183120 A1 | 7/2015 | Jones |
| 2015/0255050 A1* | 9/2015 | Diaz Lopez ........... G10D 3/173 84/322 |
| 2015/0342328 A1* | 12/2015 | Seger ...................... A45F 5/004 224/217 |
| 2015/0358543 A1* | 12/2015 | Kord ....................... G06F 3/011 345/474 |
| 2016/0054645 A1* | 2/2016 | Contino ................. F16M 13/04 348/211.99 |
| 2016/0175186 A1* | 6/2016 | Shadduck .............. A61H 19/34 601/15 |
| 2017/0176267 A1* | 6/2017 | Keller ...................... G01B 7/22 |
| 2017/0238633 A1* | 8/2017 | Fu .................... A41D 19/01594 |
| 2017/0364151 A1* | 12/2017 | Huang .................... G06F 3/017 |
| 2019/0197273 A1* | 6/2019 | Mazzone ........... G06K 7/10396 |
| 2019/0216144 A1 | 7/2019 | York |
| 2020/0061799 A1* | 2/2020 | Fryshman .............. B25G 1/107 |
| 2020/0375287 A1* | 12/2020 | Ben-Tzvi ................ G06F 3/014 |

\* cited by examiner

MULTIFUNCTIONAL FINGER-ACTIVATED DEVICE

FIELD OF THE INVENTION

The present invention relates to a multifunctional hand-mounted device. More particularly, the present invention relates to a multifunctional hand-mounted device with an actuator that can be activated by a user's single hand digit.

BACKGROUND OF THE INVENTION

Various working operations require multiple tools that may need to be used at the same time, for example, in building construction and repair, plumbing work, IT equipment repair, automotive and other machinery repair, and many others. Often, such operations require use of illumination devices to illuminate the work area that may be dark otherwise. In some circumstances, the operations have to be carried out in tights spaces that greatly limit the size and number of tools that can be used.

There are a number of known multifunctional arm-mounted tools and devices. Such devices include a hand or finger mounted master device that is capable of accommodating various types of tool attachments. The know device may also include electrical components for powering the tool, providing imaging capabilities and/or illumination devices for illuminating the work area. Examples of known devices are described, e.g., in US20160054645, US20200061799, US20080062676, US20190216144 and others.

However, these known devices still suffer from a number of disadvantages. For example, many of the devices require tool actuation via a switch positioned on a user's arm or other fingers, or even at a remote location on their body, thus requiring the user to use his or her second arm for actuation, or other fingers of the hand that is bearing the device. This can be disadvantageous where the user needs to utilize his or her other hand or even fingers on the same hand for holding other tools or performing other operations. Also, having to use other fingers on the same hand to actuate the tool may be awkward and not ergonomic, and even difficult when working in very tight spaces. Additionally, there is a need for arm-mounted devices that are very compact and can be easily and precisely maneuvered by a user. Furthermore, it would be advantageous to provide a device with signal transmission capabilities that can be easily controlled and actuated by a user's single hand digit.

SUMMARY OF THE INVENTION

To solve the above-mentioned disadvantages of the known devices and to achieve the stated needs, the multifunctional finger-mounted device of the present invention includes a finger mount configured for attachment to at least one of a user's fingers, a tool holder positioned on the finger mount and configured to receive at least one tool, an electronics unit connected to the at least one tool, and a switch for actuating the electronics unit. The switch is actuated by bending and straightening a user's finger.

In some embodiments, the switch is turned on by straightening the user's finger and is turned off by bending the user's finger. The switch may include at least one contact point that is disconnected by bending the user's finger.

In certain embodiments of the invention, the multifunctional finger-mounted device includes a connection pathway having a first end coupled to the electronics unit and a second end coupled to at least one of a power source and a processing unit. The processing unit can include at least one of a storage device and a communications device and the connection pathway can include at least one of a power connection and a signal connection. In some cases, the connection pathway can be a flexible cable. The power source and the processing unit can be coupled to a user's torso.

In some embodiments, the electronics unit includes an imaging device for capturing and transmitting an image or video of an area adjacent the at least one tool. In additional embodiments, the electronics unit includes an illumination device for illuminating an area adjacent the at least one tool.

The at least one tool may include one of a fastener driver, a laser pointer, a temperature and/or pressure sensor, a knife blade, a flame device, a coupling device, a telescoping rod, and a fashion item.

In one embodiment, the device may also include a tool holder coupled to a user's torso for holding a plurality of tools for use with the device. The device may further include a hand mount configured for attachment to a portion of a user's hand.

The specification also describes a multifunctional finger-mounted device including a finger mount configured for attachment to at least one of a user's fingers, a tool holder positioned on the finger mount and configured to receive at least one tool, an electronics unit connected to the at least one tool, and a switch for actuating the electronics unit, wherein the switch is actuated by a motion of at least one of a user's fingers.

Other objective of the present invention is to provide a method for utilizing a multifunctional finger-mounted device, including the steps of affixing a finger mount to at least one of a user's fingers, coupling at least one tool to a tool holder positioned on the finger mount, switching on an electronics unit connected to the at least one tool by at least one of bending and straightening a user's finger, and operating the at least one tool by the at least one of the user's fingers.

In some embodiments, the step of switching on the electronics unit includes straightening the user's finger and the method further includes the step of switching off the electronics unit by bending the user's finger.

In an embodiment, the method also includes the step of sending a signal to and from the at least one tool via a connection pathway coupled to a processing unit.

The electronics unit may include an imaging device and the method may also include the step of capturing an image or video of an area adjacent the at least one tool via the imaging device. The electronics unit may further include an illumination device and the method may also include the step of illuminating an area adjacent the at least one tool via the illumination device.

In some embodiments, the method may include the step of containing a plurality of tools in a tool holder coupled to a user's torso and selecting at least one of the plurality of tools for use with the multifunctional finger-mounted device.

Other objects of the invention and its particular features and advantages will become more apparent from consideration of the following drawings and accompanying detailed description.

BRIEF DESCRIPTION OF THE DRAWINGS

The accompanying drawings are included to provide a further understanding of the present disclosure. The drawings illustrate exemplary embodiments of the present disclosure; however, the drawings are merely provided for reference and illustration, without any intention to be used for limiting the present disclosure.

DETAILED DESCRIPTION OF THE INVENTION

With reference now to the drawings, embodiments of the present invention will be described.

Advantageously, the device of the present invention facilitates efficient holding and operating of hand tools that are typically handheld when in use. As such, the device of the invention allows a user to have an extra helping hand because the tool can be used with one finger, rather than one or two hands for holding and manipulating the operation of the device, thus freeing up hands to be used in other work tasks. The inventive device also allows for easy and fast changeover to and from using the mounted tool.

Additionally, the device of the present invention allows for increased maneuvering of hand tools in tight spaces where it may not be possible for the user to utilize their whole hand that is holding the tool. The device also provides for illumination and imaging capabilities such that it can be operated in spaces with insufficient lighting and can record and transmit audio and/or video data to the user. Furthermore, the inventive device enables easy and efficient operation with an actuation mechanism that can be turned on and off via a simple bending of a user's one or more fingers.

Figure 1:
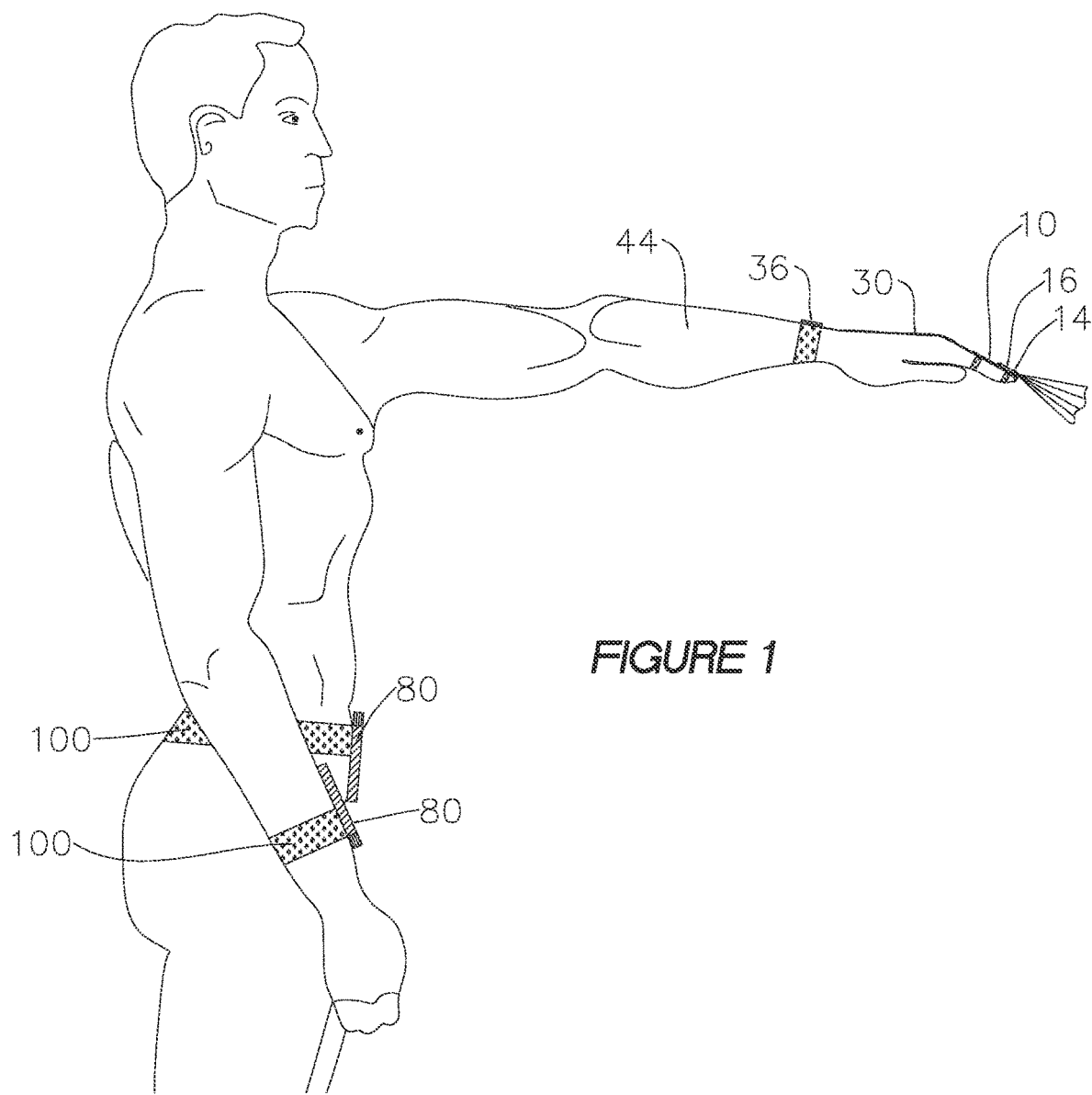
FIG. 1 illustrates a user wearing the multifunctional device of the present invention.
Figure 2:
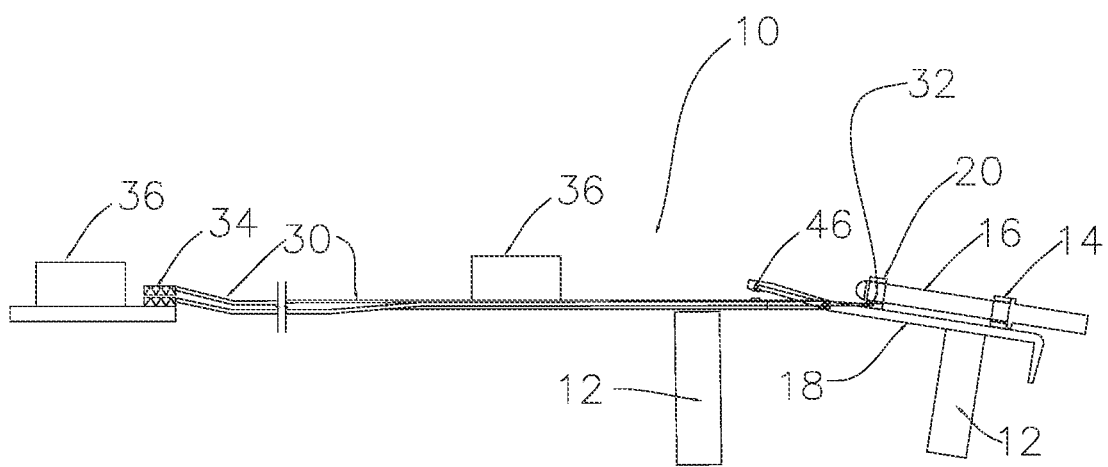
FIG. 2 is a partially schematic side view of the multifunctional device in accordance with the present invention.

FIG. 2 is an exemplary embodiment of the multifunction device of the present invention. The multifunctional device 10 includes a finger mount 12 configured for attachment to at least one of a user's fingers. In some embodiments, the finger mount 12 may be attached to a user's single finger 60, as shown in FIG. 1. In order embodiments, the finger mount 12 may be attached to two or more of the user's fingers, including a thumb. Preferably, but not necessarily, the finger mount 12 is attachable to a user's index finger of either right or left hand, or both.

Figure 5A:
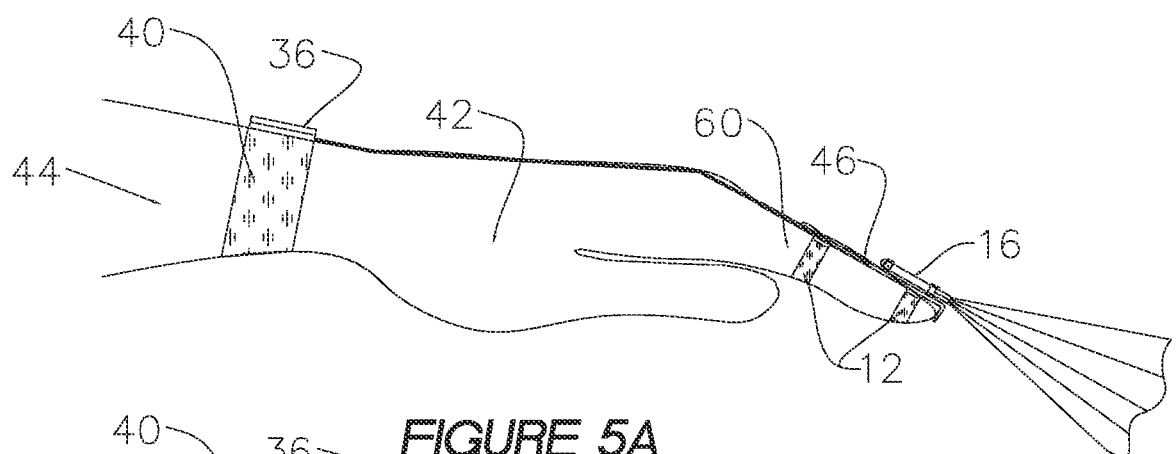
FIGS. 5A and 5B are a partially schematic views of the multifunctional device of the present invention being positioned on a user's arm.
Figure 5B:
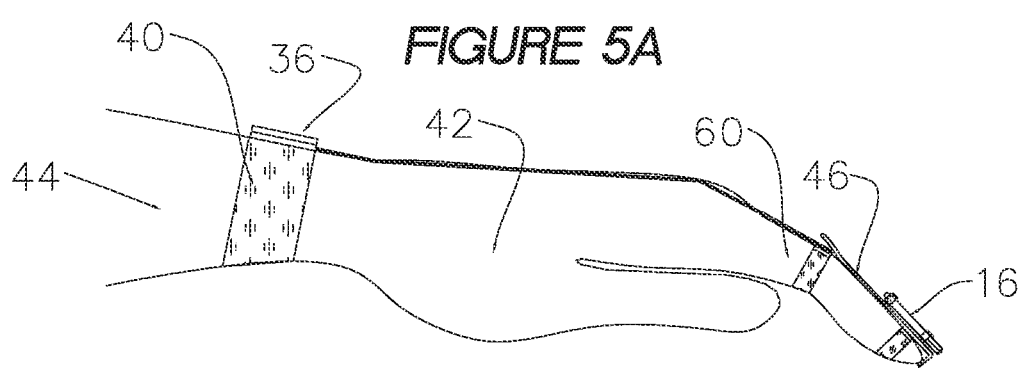
Figure 6:
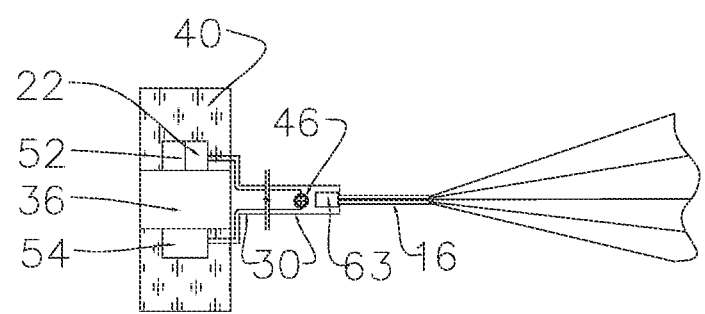
FIG. 6 is a partially schematic top view of the multifunctional device of FIGS. 5A-5B.

The finger mount 12 may be one or more straps made of any suitable elastic or resilient material that is wrapped around the user's one or more fingers and is secured at its ends, as shown in FIGS. 5A and 5B. For example, elastic, rubber or Velcro® material may be used for the finger mount 12, as well as other suitable materials. The finger mount 12 may be a continuous loop, into which the user inserts his or her finger(s). In other embodiments, the finger mount 12 may have two ends that are securable to each other once the finger mount is placed around the user's finger(s). In further exemplary embodiments, the finger mount 12 may be a more rigid member, such as e.g. plastic, metal, etc., that has some resiliency and is inserted over the user's finger(s).

The finger mount 12 may be a singular member or may include two or more spaced out members into which different portions of the user's finger(s) are inserted. Preferably, a size of the finger mount 12 is adjustable such that it can securely fit different sizes of user's fingers. In additional preferred embodiments, the finger mount 12 provides a firm connection between the finger and the device, but can also be articulated for digit flexibility, and in some cases, for activating a power and/or signal feed, as discussed in more detail below.

The multifunctional device 10 also includes a tool holder 14 positioned on the finger mount 12 and configured to receive at least one tool 16. In one embodiment, the tool holder 14 has a base 18 with one or more straps 20 attached to the base. The base 18 may be made with any rigid or semi-rigid material, e.g., metal, plastic, etc. In a preferred embodiment, the base 18 allows for enough flexibility such that a user is capable of bending the finger onto which the finger mount 12 with the tool holder 14 is inserted. This can be accomplished by using a flexible material or by providing a bendable area of the base 18, via e.g., a hinge or a similar articulatable mechanism.

The straps 20 may be made of any suitable elastic or resilient material, such as elastic, rubber or Velcro® material, as well as other suitable materials. The straps may be in a form of continuous loops, into which the tool 16 is inserted. In other embodiments, the straps may have two ends that are securable to each other once the tool 16 is placed therein. In other exemplary embodiments, the tool holder 14 may have one or more rigid attachment members positioned on the base 18 and made with e.g., plastic, metal, etc. The attachment members preferably have some resiliency to allow a tool to be inserted and securely held therein. In additional embodiments, the tool holder 14 may include additional attachment members to assist in securing the tool 16 to the tool holder. For example, the tool holder may include a set screw or a clamp to help retain the tool in the tool holder. The tool holder 14 is intended to provide a relatively rigid attachment to the finger mount 12 and to receive at least a portion of the tool 16.

A wide variety of tools 16 may be used with the multifunctional device of the present invention. The examples include, but are not limited to, a fastener driver with various heads for installing or removing various screws and/or bolts; an indicating device, such as a laser pointer, for visually highlighting items of interest; a temperature and/or pressure sensor for scanning physical conditions; a knife blade for cutting objects; a flame device for heating objects; a coupling device, such as a hook, magnet, tweezers, or pliers, for attaching to objects; a writing device, such as a pen, pencil or stylus; a telescoping rod for extending reach of a finger; a fashion item, such as glowing finger nails or sparking ends; a flashlight for visual assistance in lighting an area; a measuring device; a scratching tool; a cosmetic tool; an imaging instrument, such as a camera, for gathering visual and/or audible signals for storage and transmission; a tool used for food preparation and/or eating, such as a whisk, cooking utensil, fork, spoon, etc.; a personal hygiene item, such as a toothbrush; or other instruments, tools or devices which may be utilized when mounted on the hand of the user.

Preferably, the tool holder 14 is designed such as to fit a wide variety of tool sizes and/or tool shapes. In some embodiments, the tool holder 14 may be removably attached to the finger mount 12, such that a different type of tool holder can be easily attached to the device 10 to accommodate a particular type of a tool. Further, one or more interchangeable tool holders may be provided as a kit with the inventive multifunctional device.

The multifunctional device further includes an electronics unit 22 connected to the at least one tool 16 and a switch 46 for actuating the electronics unit, as shown in FIGS. 5A and 5B. The electronics unit 22 functions to provide power and/or signal transmission to the device 10 and can also provide imaging and/or illumination capabilities, as described in more detail below. The device further includes a connection pathway 30 having a first end 32 coupled to the electronics unit 22 and a second end 34 coupled to at least one of a power source and a processing unit. For example, the connection pathway 30 may be coupled to a power source 36, such as a battery to transmit electrical power to the device 10. The electrical power may be necessary to operate a tool coupled to the device 10 that may require power to function, such as e.g., an electric screwdriver or a flashlight. In this case, the electronic unit 22 includes a coupling device that couples to the tool positioned in the tool holder 14 for transmission of electrical power. The electrical power may also be necessary to operate an illumination and/or imaging device coupled to the electronics unit 22, as described in more detail below. In some embodiments, the electronics unit 22 may include an electric motor, or other components that move, rotate and/or vibrate the tool holder 14 and/or the tool 16 mounted thereto.

The power source 36 may be attached to a user's hand, arm, torso or any other part of the user's body. For example, as illustrated in FIG. 1, the battery pack 36 may be positioned on the user's wrist between the user's hand 42 and arm 44. The battery pack 36 may be attached with a flexible wrist strap 40 or any other suitable attachment device. Preferably, the wrist strap 40 is adjustable so that it can fit different wrist sizes and/or can also be optionally attached to another part of the user's arm, e.g., an upper arm. The power source 36 optionally includes an on-off switch allowing the user to turn the power source on and off directly from the power source. In other embodiments, the power source may be positioned on the user's other arm, hand or wrist that is not used to attach the finger mount 12 to. It is noted that the power source may also be a hardwired unit or may be connected directly into an electrical framework via an outlet.

The electronics unit 22 preferably includes an on-off switch 46 for actuating at least one of a power connection and a signal connection via the connection pathway 30. In one embodiment, the switch 46 includes power and/or signal contact points that may be disconnected or separated. Preferably, the contact points are positioned on or coupled to the base 18 of the tool holder 14 around the flexible or hinged portion such that when the base 18 is bent, the contact point are disconnected. Thus, the switch 46 may be actuated by bending and straightening a user's finger, thereby connecting or disconnecting the contact points. In a preferred embodiment, the switch 46 is turned on by straightening the user's finger, as shown in FIG. 5A, and is turned off by bending the user's finger, as shown in FIG. 5B. It is understood, however, that the switch 46 may also be turned on by bending the finger and turned off by straightening the finger. This switch mechanism is advantageous in that it allows for easy actuation of the power and/or signal transmission to the device 10 via a single digit, without requiring the user to utilize other fingers or the other hand to turn the switch on and off, thus freeing up other fingers and hand for other actions.

The activation switch 46 may be set to provide momentary on or momentary off signal. In other embodiments, the switch 46 may be set to provide constant on signal until contact is reestablished to turn the signal off.

It is noted that the switch may also be positioned on other fingers and/or more than one finger and may be actuated by bending and straightening those finger(s) thereby connecting and disconnecting the contact points with the connection pathway. Furthermore, it is possible to place the switch on a user's wrist, wherein the contact points may be connected and disconnected by bending the wrist. It is also possible to provide a switch in a form of a push button or a toggle switch, which may be positioned on user's hand, arm, torso, or at another suitable location.

Figure 3:
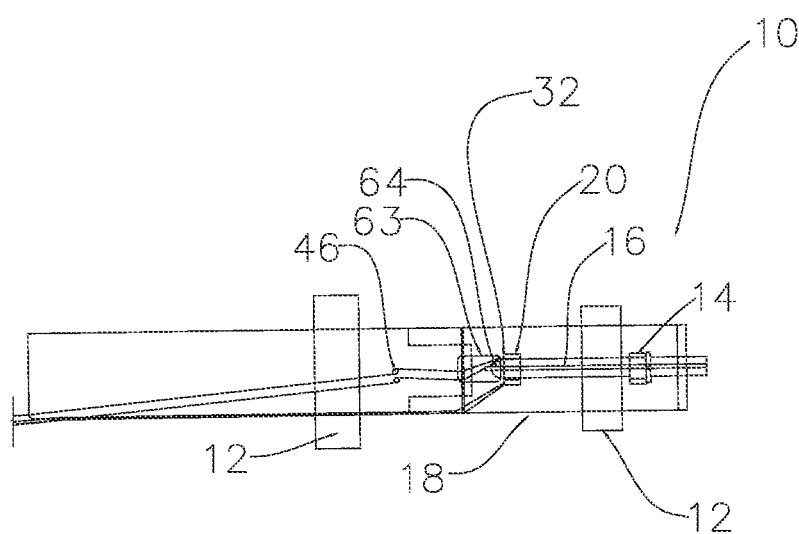
FIG. 3 is a partially schematic top view of the multifunctional device of FIG. 2.
Figure 4:
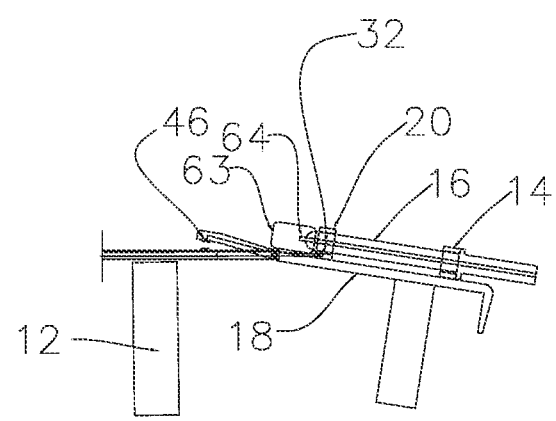
FIG. 4 is a partially schematic side view of the finger mount portion of the multifunctional device of FIG. 2.
Figure 7:
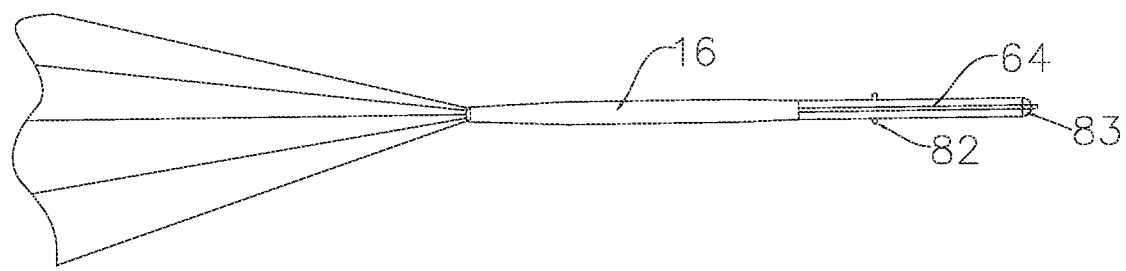
FIG. 7 is a partially schematic top view of a tool of the multifunctional device of the present invention.

In some embodiments, the tool 16 to be used with the multifunctional device 10 has a drive shaft 64, as shown in FIG. 7. The drive shaft 64 is designed to be coupled with a drive motor 63 positioned on the tool holder 14, as shown in FIG. 3. The drive motor 63 is coupled to the power source 36 through the switch 46, such that activation of the switch 46 turns on the drive motor 63 to power the tool 16 connected thereto. The drive shaft 64 may also include an end connector 83 for coupling to the tool holder 14. Any suitable connected, such as e.g., a lock snap, may be used. The drive shaft 64 may further include one or more guide notches 82 that couple with one or more guide channels inside the tool holder to ensure a proper insertion and positioning of the tool 16 inside the tool holder 14. The guide notches 82 may also function as stop tabs to facilitate proper positioning of the tool in the tool holder.

Figure 11:
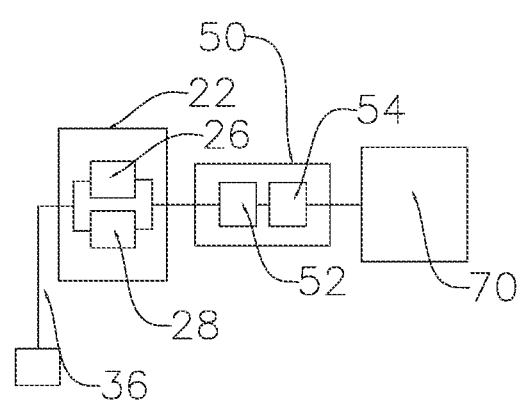
FIG. 11 is a schematic view of the electronic components of the multifunctional device of the present invention.

The electronics unit 22 may include an imaging device 26 having capabilities to capture and transmit an image and/or video of an area adjacent the working area or the tool 16. Any suitable imaging device known in the art may be used in accordance with the present invention. The imaging device 26 is coupled to the power source and/or a processing unit, as described in more detail below, via the connection pathway 30, as shown in FIG. 11. The switch 36 is used to actuate power supply to the imaging device 26 to turn it on and off, such as by bending or straightening the finger to which the imaging device is mounted.

In some embodiments, the imaging device 26 is in an electrical connection with a processing unit 50, as shown in FIG. 11. The processing unit 50 transmits control signals to the imaging device 26 and receives image or video data captured by the imaging device 26. The processing unit 50 may be coupled to a user device 70, such as a tablet, smart phone, laptop computer, etc., and may transmit the data to such user device such that the user has an enlarged view of the work surface and item being worked on. The processing unit 50 may be internal with the device and positioned adjacent the tool 16. In alternative embodiments, the processing unit 50 may be positioned at a different location on the user's body, e.g., on a hand, arm or torso. The processing unit 50 may also include a storage device 52 and/or a communications device 54. The storage device 52 may be an internal SD chip or any other suitable storage device known in the art. The storage device 52 is used to store data captured by the tool 16 and/or imaging device 26. The communications device 54 may be a Wi-Fi or Bluetooth signal generator and may be used to transmit signals and data between the multifunctional device 10 and an external device, such as a personal user device.

The electronics unit 22 may further include an illumination device 28 for illuminating an area adjacent the working area or the tool, as shown in FIG. 11. Any suitable light source may be used as the illumination device 28, such as an ordinary light bulb, light emitting diode, or a laser diode module including a focusing lens, a laser diode and a circuit module. The illumination device 28 is coupled to the power source and/or a processing unit, as described in more detail below, via the connection pathway 30. The switch 46 is used to actuate power supply to the illumination device 28 to turn it on and off, such as by bending or straightening the finger to which the illumination device is mounted. It may also be possible to control the intensity and/or color of light supplied to the illumination device 28, e.g., a UV or infrared light, by transmitting a control signal from the processing unit 50 to the illumination device 28 via the connection pathway 30.

In some embodiments, the connection pathway 30 may be a flexible cable, with one end 32 connected to the electronics unit 22 and the other end 34 connected to the power source 36 and/or the processing unit 50. The connection pathway 30 may include a fiber optic cable. In additional embodiments, the connection pathway may be eliminated if a WiFi signal and/or power device is incorporated into the device 10.

Figure 8:
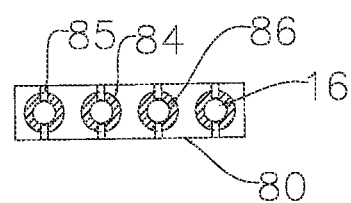
FIG. 8 is a partially schematic top view of a tool holder for the multifunctional device of the present invention.
Figure 9:
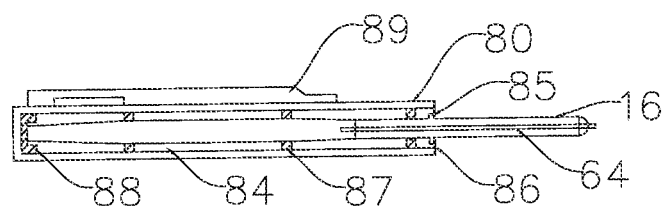
FIG. 9 is a partially schematic cross-sectional view of the tool holder of FIG. 8 showing a tool positioned therein.

As shown in FIG. 1, a tool holder 80 may also be provided for holding a plurality of tools for use with the device 10. The tool holder 80 may have any desirable shape and design. Preferably, the tool holder 80 has a plurality of pockets or compartments for housing various tools and attachments, as shown in FIG. 8. The tool holder 80 may be attached to a user's wrist and/or belt, as shown in FIG. 1, or any other part of the user's body and may include a clip 89, as shown in FIG. 9, for attachment to a user's belt or clothing. In additional embodiments, the tool holder 80 may be provided with an attachment member 100, such as elastic strap, that may be attached to the user's wrist, waist, or another body part. The tools 16 are stored in compartments where they are held firmly in place until ready for extraction and use with the device 10. For self-powered tools, the compartments may have contacts to recharge batteries during storage.

In some embodiments, as shown in FIGS. 8 and 9, the tool holder 80 includes a plurality of tool storage slots 84. Each tool storage slot 84 is configured to house a tool 16 and has an alignment tab 85 that couples with the guide notch 82 on the tool drive shaft 64 to ensure a proper positioning of the tool 16 within the tool storage slot 84, as shown in FIG. 9. The tool storage slots 84 may also include a tool guide 86 and one or more tool spaces 87 to further ensure a proper positioning and retention of the tool 16 within the tool storage slot 84. In some embodiments, the tool storage slot 84 also includes a cap cushion 88 positioned at the bottom of the slot 84 to cushion and protect the proximal end of the tool 16.

Figure 10A:
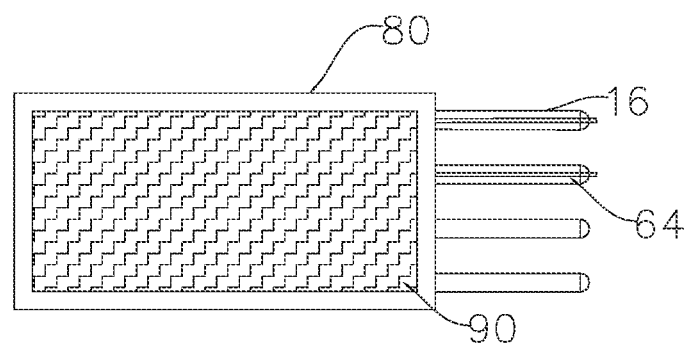
FIGS. 10A and 10B are top views of tool holder embodiments for the multifunctional device of the present invention.
Figure 10B:
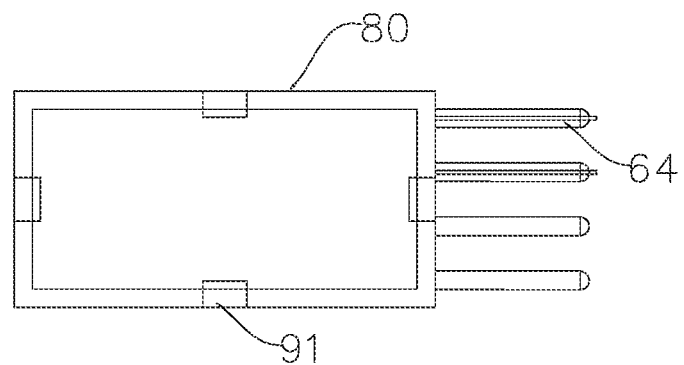

The tool holder 80 may be provided with a screen 90, as shown in FIG. 10A. The screen 90 may coupled to the imaging device 26 via the connection pathway 30 and may display the image of the tool 16 and/or adjacent working area to the user, which can conveniently view the image from his or her wrist. In additional embodiments, the tool holder 80 may be provided with a plurality of clips 91 configured to couple a mobile device, such as a cell phone, to the tool holder. The mobile device may connect to the electronic unit 22 and/or the imaging device 26 via the connection pathway 30 and/or WiFi signal to display feedback from the electronic unit/imaging device to the user via the mobile device screen.

When the user wants to utilize the device of the invention, he or she will first attach the finger mount 12 to one or more of his or her fingers 60. Next, the user will choose a tool 16 that he or she wants to work with and position the tool 16 into the tool holder 14 attached to the finger mount 12. The user may choose a particular type of a tool holder that is appropriate for a particular tool being used if more than one types of tool holders is available. Positioning the tool 16 in the tool holder 14 may include connecting the tool to the drive motor 63 and/or the electronics unit 22 such that electric power and/or digital signal can be sent to and from the tool via the electronics unit 22. The electronic unit 22 is connected to the connection pathway 30, which in turn is connected to the source of power 36, such as a battery and/or the processing unit 50.

The user will then turn on the electronics unit 22 via the switch 46 by, for example, straightening his or her finger to which the tool is mounted, which in turn brings the contact points into contact and allows for transmission of electric power and/or digital signal to and from the tool. If the attached tool 16 is a power tool, this will actuate the tool or actuate the drive motor 63 to move, rotate and/or vibrate the tool holder and/or the tool mounted thereto. Turning on the switch 45 also allows the user to turn on the illumination device 28, if included, to illuminate the working area. If the imaging device 26 is provided, it can also be turned on by activating the switch 46 to begin capturing image or video data, which can then be transmitted to a user device, such as a tablet, smart phone, laptop computer, etc.

When the user wants to stop using the tool, he or she may simply bend the finger 60, which will disconnect the contact points on the switch 46 and will terminate transmission of electrical power and/or digital signal to and from the tool. This way, the user may easily turn the switch 46 on and off via motion of only one finger, which is particularly useful when working in tight spaces and frees up other fingers and other hand for performing other tasks. Actuating the switch 46 on the device may also turn on and off transmission of digital signal to and from the device, such as for example, to transmit control signal for operating the tool or to transmit data captured by the imaging device.

The present invention is intended to store a variety of tools or devices for easy access, is configured to connect the devices to the end of one or more fingers for dexterity of use and fine motor control of device placement and provides controllable power and/or signal feedback for the operation of the attached devices.

It should be understood that the foregoing is illustrative and not limiting, and that obvious modifications may be made by those skilled in the art without departing from the spirit of the invention. Accordingly, reference should be made primarily to the accompanying claims, rather than the foregoing specification, to determine the scope of the invention.

What is claimed is:

1. A multifunctional finger-mounted device, comprising:
   a finger mount configured for attachment to at least one of a user's fingers;
   a tool holder positioned on the finger mount and configured to accommodate a plurality of different tools;
   an electronics unit connected to at least one of the plurality of different tools, wherein the electronics unit is coupled to a power source and supplies power to the at least one tool; and a switch for actuating the electronics unit;
wherein the switch comprises a first contact point and a second contact point that are disconnected to turn off the supply of power to the electronics unit, wherein at least one of the first contact point and the second contact point moves in a pivoting manner when being disconnected, wherein the first and second contact points are positioned on a top side of the user's finger;
wherein the switch is actuated by bending and straightening a user's finger, which turns on and off the supply of power to the electronics unit.

2. The device of claim 1, wherein the switch is turned on by straightening the user's finger and is turned off by bending the user's finger.

3. The device of claim 1, further comprising a connection pathway having a first end coupled to the electronics unit and a second end coupled to at least one of the power source and a processing unit.

4. The device of claim 3, wherein the processing unit comprises at least one of a storage device and a communications device.

5. The device of claim 3, wherein the connection pathway comprises at least one of a power connection and a signal connection.

6. The device of claim 3, wherein the connection pathway comprises a flexible cable.

7. The device of claim 3, wherein the power source and the processing unit are coupled to a user's torso.

8. The device of claim 1, wherein the electronics unit comprises an imaging device for capturing and transmitting an image or video of an area adjacent the at least one tool.

9. The device of claim 1, wherein the electronics unit comprises an illumination device for illuminating an area adjacent the at least one tool.

10. The device of claim 1, wherein the at least one tool comprises one of a fastener driver, a laser pointer, a temperature and/or pressure sensor, a knife blade, a flame device, a coupling device, a telescoping rod, and a fashion item.

11. The device of claim 1, further comprising a tool holder coupled to a user's torso for holding the plurality of different tools for use with the device.

12. The device of claim 1, further comprising a hand mount configured for attachment to a portion of a user's hand.

13. A multifunctional hand-mounted device, comprising:
a finger mount configured for attachment to at least one of a user's fingers;
a tool holder positioned on the finger mount and configured to receive at least one tool;
a motor coupled to the tool holder and configured to actuate the at least one tool;
an electronics unit connected to the at least one tool and the motor; and
a switch for actuating the electronics unit;
wherein the switch comprises a first contact point and a second contact point that are disconnected to turn off the supply of power to the electronics unit, wherein at least one of the first contact point and the second contact point moves in a pivoting manner when being disconnected; and
wherein the switch is turned on by straightening at least one of the user's fingers and is turned off by bending the at least one of a user's fingers.

14. The device of claim 13, wherein the finger mount is configured for attachment to at least one of a distal phalanx and a middle phalanx of the at least one of the user's fingers.

15. A method for utilizing a multifunctional finger-mounted device, comprising the steps of:
affixing a finger mount to at least one of a user's fingers;
coupling at least one tool to a tool holder positioned on the finger mount;
switching on an electronics unit connected to the at least one tool by at least one of bending and straightening a user's finger to initiate supply of power from a power source to the electronics unit, wherein the switch comprises a first contact point and a second contact point that are disconnected to turn off the supply of power to the electronics unit, and wherein at least one of the first contact point and the second contact point moves in a pivoting manner when being disconnected; and
operating the at least one tool by the at least one of the user's fingers;
wherein the step of switching on the electronics unit comprises straightening the user's finger and wherein the method further comprises the step of switching off the electronics unit by bending the user's finger.

16. The method of claim 15, further comprising the step of sending a signal to and from the at least one tool via a connection pathway coupled to a processing unit.

17. The method of claim 15, wherein the electronics unit comprises an imaging device and wherein the method further comprises the step of capturing an image or video of an area adjacent the at least one tool via the imaging device.

18. The method of claim 15, wherein the electronics unit comprises an illumination device and wherein the method further comprises the step of illuminating an area adjacent the at least one tool via the illumination device.

19. The method of claim 15, further comprising the step of containing a plurality of tools in a tool holder coupled to a user's torso and selecting at least one of the plurality of tools for use with the multifunctional finger-mounted device.

* * * * *